United States Patent
Tatsuoka et al.

[11] Patent Number: 5,859,389
[45] Date of Patent: Jan. 12, 1999

[54] COMBINATIONAL WEIGHING OR COUNTING METHOD AND APPARATUS THEREFOR WITH ENHANCED OCCUPANCE OF COMBINATIONAL SELECTION

[75] Inventors: Masahiko Tatsuoka; Toshiyuki Komatsu, both of Shiga, Japan

[73] Assignee: Ishida Co., Ltd., Kyoto, Japan

[21] Appl. No.: 295,286

[22] Filed: Aug. 24, 1994

[30] Foreign Application Priority Data

Aug. 24, 1993 [JP] Japan ................................ 5-232324

[51] Int. Cl.⁶ .......................... G01G 19/14; G01G 13/00
[52] U.S. Cl. ........................................ 177/25.18; 177/17
[58] Field of Search ........................ 177/17, 25.18

[56] References Cited

U.S. PATENT DOCUMENTS

| | | | |
|---|---|---|---|
| 4,508,186 | 4/1985 | Sashiki et al. ........................... | 177/1 |
| 4,516,643 | 5/1985 | Nakagawa ................................. | 177/1 |
| 4,566,070 | 1/1986 | Tanaka .................................... | 364/567 |
| 4,610,323 | 9/1986 | Chenoweth et al. ..................... | 177/25.18 |
| 4,642,788 | 2/1987 | Haze ....................................... | 364/567 |
| 4,828,054 | 5/1989 | Mosher .................................... | 177/25.18 |
| 4,836,310 | 6/1989 | Yamano ................................... | 177/25.18 |

FOREIGN PATENT DOCUMENTS

| | | |
|---|---|---|
| 0097531 | 1/1984 | European Pat. Off. . |
| 0298736 | 1/1989 | European Pat. Off. . |
| 0319225 | 6/1989 | European Pat. Off. . |
| 63-30725 | 2/1988 | Japan . |
| 2095934 | 11/1982 | United Kingdom . |

*Primary Examiner*—Randy W. Gibson
*Attorney, Agent, or Firm*—Loeb & Loeb LLP

[57] ABSTRACT

A combinational weighing or counting apparatus designed to increase the probability of selection of combinations. This combinational weighing or counting apparatus includes a plurality of weighing hoppers ($6_i$), and a plurality of driving feeders ($3_i$) for supplying articles (M) from an upstream side towards the corresponding weighing hoppers ($6_i$) when the driving feeders ($3_i$) are driven. In this combinational weighing or counting apparatus, the value at which the probability of occurrence of the combinational calculated weight or count, attains a maximum value is chosen to be greater than the target combined weight $T_M$, but falling within an allowance of an lower limit $T_{MIN}$ to an upper limit $T_{MAX}$ of the target combined weight $T_M$.

8 Claims, 5 Drawing Sheets

5,859,389

COMBINATIONAL WEIGHING OR COUNTING METHOD AND APPARATUS THEREFOR WITH ENHANCED OCCUPANCE OF COMBINATIONAL SELECTION

BACKGROUND OF THE INVENTION

1. Field of the Invention

The present invention relates to a combinational weighing or counting method and an apparatus therefor which utilizes a plurality of weighing devices for weighing or counting a plurality of articles of varying weight such as, for example, snacks, candies, fruits or vegetables or small machine parts, and then to select an appropriate combination of the articles based on results of weight measurements or counts.

2. Description of the Prior Art

The combinational weighing apparatus is a machine so designed that the articles of varying weight such as snacks, candies, fruits or vegetables can be averaged or substantially matched in weight to a target combined weight. An example of this combinational weighing apparatus is well known and is disclosed in, for example, the Japanese Laid-open Patent Publication No. 63-30725 published in 1988, and will now be discussed with reference to FIG. 6.

Referring to FIG. 6, articles M to be weighed which have been transported by means of a transport conveyor 1 are dispensed through a dispensing feeder 2 into a plurality of vibratory feeders or driving feeders $3_1$ to $3_n$ which subsequently loads fractions of the articles into respective weighing hoppers $6_1$ to $6_n$. A combination control means (not shown) selects some of the weighing hoppers $6_1$ to $6_n$ to thereby select an appropriate combination of the weighing hoppers $6_1$ to $6_n$. In other words, based on the weights given by the respective weighing hoppers $6_1$ to $6_n$, the combination control means selects the appropriate combination of the weighing hoppers $6_1$ to $6_n$ which would eventually provides a measured combined weight equal or generally equal to a target combined weight. The respective fractions of the articles M accommodated within the selected appropriate combination of the weighing hoppers $6_1$ to $6_n$ are then discharged into a collecting and discharging chute 9.

According to the prior art, in order to accomplish the selection of the appropriate combination as precisely and as efficiently as possible, arrangement has hitherto been made that the amount of the articles M to be supplied into each of the weighing hoppers $6_1$ to $6_n$ is equal or approximately equal to a target supply weight T (for example, the quotient of the target combined weight $T_M$ divided by the number m of the weighing hoppers selected for the combination) to which the articles are supplied into the respective weighing hoppers $6_1$ to $6_n$. For this purpose, parameters for controlling a supply ability of each of the driving feeders $3_1$ to $3_n$ (such as representative of the amplitude of vibration to which each driving feeder is vibrated and the vibrating time over which such driving feeder is vibrated) are controlled in the following manner.

A parameter setting means (not shown) determines, for each of the driving feeders $3_1$ to $3_n$, parameters for the current weighing cycle on the basis of the parameters for the previous weighing cycle and the amounts of the articles actually supplied into the weighing hoppers $6_1$ to $6_n$ during the previous weighing cycle. The driving feeders $3_1$ to $3_n$ are vibrated according to the parameter so determined for the current weighing cycle that the amounts of the articles M corresponding to the target supply weight T can be supplied into the respective weighing hoppers $6_1$ to $6_n$.

The target supply weight T referred to above is determined in the following manner. Assuming that the number of the weighing hoppers $6_1$ to $6_n$ is 10 (i.e., n=10), arbitrarily chosen number m of the ten weighing hoppers will give the maximum number of calculated weights (combinational calculated weights) when the number m of the weighing hoppers is 5. Accordingly, the value of the target combined weight $T_M$ divided by the arbitrarily chosen number, that is, 5, of the weighing hoppers is chosen as the target supply weight T. In this way, the combinational calculated weight $W_M$ given by summing one or a number n of measured weights $W_1$ together gives rise to a distribution shown by the phantom line in FIG. 1(b), showing the highest probability at a weight corresponding to the target combined weight $T_M$.

On the other hand, the weight of articles packed in, for example, a bag, that is, the combination selected weight $W_S$, is selected out from the combinational calculated weight $W_M$ in the following manner. The combinational calculated weight $W_M$ has an allowance ranging between a predetermined lower limit $T_{MIN}$ and a predetermined upper limit $T_{MAX}$ and, accordingly, the value within the allowance between the lower limit $T_{MIN}$ and the upper limit $T_{MAX}$ of the combinational calculated weight $W_M$ is selected for the combination selected weight $W_S$. In other words, an area S2 hatched by the phantom lines in FIG. 1(b) is selected for the combination selected weight $W_S$.

As discussed hereinabove, since the combinational calculated weight $W_M$ is so determined as to occur at the target combined weight $T_M$ with the highest probability, the probability with which the combinational calculated weight $W_M$ takes a value slightly smaller than the target combined weight $T_M$ is comparable to the probability with which the combinational calculated weight $W_M$ is slightly greater than the target combined weight $T_M$. However, since the target combined weight $T_M$ is generally equal to the lower limit $T_{MIN}$, the combinational calculated weight $W_M$ which is of a value slightly smaller than the target combined weight $T_M$ which occurs with a high probability is not selected for the combination. Accordingly, the prior art method has a problem in that, even though weight measurement is carried out, cases often occur in which no combinational selection is carried out.

Where no combinational selection occurs even though the weight measurement has been carried out, it requires, for example, that all of the articles M within the respective weighing hoppers $6_1$ to $6_n$ must be discharged to the outside through the collecting and discharging chute 9 and, therefore, it brings about an additional problem in that the time required to complete each cycle of packing of the articles tends to be prolonged. It is to be noted that similar problems occur with the combinational counting apparatus.

SUMMARY OF THE INVENTION

The present invention has been devised with due regards paid to the foregoing problems and is intended to provide an improved combinational weighing or counting method and an improved combinational weighing or counting apparatus, in which there is less possibility that a combinational selection will not take place.

To this end, according one aspect of the present invention, a combinational weighing or counting method is featured in that the value at which the combinational calculated value obtained by the combination of measured values of the weighing hoppers occurs with a maximum probability is chosen to be greater than the target combined value $T_M$ and within the allowance.

The principle of the above described method of the present invention will now be described with reference to FIG. 1(b). Since the combination calculated value occurs with a maximum probability at the value $T_M1$ greater than the target combined value $T_M$, and since both the value slightly greater than the value $T_M1$ and the value slightly smaller than the value $T_M1$ are greater than the target combined value $T_M$ which is the lower limit, a combinational selection of the both values is possible. Accordingly, as can readily be understood from FIG. 1(b), the probability with which the combination selection is possible according to the present invention (an area S1 hatched by the solid lines) is higher than the probability with which the combination selection is possible according to the prior art (the area S2 hatched by the phantom line).

Since, in the distribution shown by the solid line in FIG. 1(b), the probability of occurrence takes a maximum value at this value $T_M1$, the surface area of the hatched area S1 shown by the solid lines becomes greater than the surface area of the hatched area S2 shown by the phantom line and, therefore, effects of the present invention can be obtained and this is encompassed within the scope of the present invention.

Although the probability with which a value equal to the target combined value $T_M$ occurs may be lowered as compared with that according to the prior art, it will not vary greatly from the prior art and, therefore, it does not matter.

According to another aspect of the combinational weighing or counting method of the present invention, a quotient of the combinational calculated values divided by a real number which is not an integer, is used as an average value of target supply values to which the articles are to be supplied to the respective weighing hoppers.

With this method, the probability of occurrence of the value obtained by multiplying the average value of the target supply values times an arbitrarily chosen integer, that is, the combinational calculated value, is distributed as shown by the solid line in FIG. 1(b) and, for this reason, the probability of occurrence of the combinational calculated value will attain a maximum value at a value $T_M1$ which is greater than the target combined value $T_M$. Accordingly, the probability of selection of the combination becomes high as is the case with the combinational weighing or counting method according to the first aspect of the present invention.

According to a third aspect of the present invention, the combinational weighing or counting apparatus is provided with all input setting means capable of being manipulated to input an integer and a real number, which is not an integer, as a number of the weighing hoppers selected to thereby to determine a target supply value, to which the articles are to be supplied to the individual weighing hopper, which is obtained by dividing the target combined value, and also with a target supply value calculating unit capable of dividing the target combined value by the number of the selected weighing hoppers which is the integer and the real number which is not an integer, thereby implementing the combinational weighing or counting method according to any one of the foregoing two aspect of the present invention.

According to a fourth aspect of the present invention, the combinational weighing or counting method is featured in that a parameter for controlling a supply ability of each of the driving feeders is determined on the basis of a quasi-target combined value $T_M1$ which is greater than the target combined value $T_M$, but falling within the allowance of an lower limit $T_{MIN}$ to an upper limit $T_{MAX}$ as shown in FIG. 1(b).

With this combinational weighing or counting method according to the fourth aspect of the present invention, since the parameter for each of the driving feeders is determined on the basis of a quasi-target combined value $T_M1$, the probability of occurrence of the combinational calculated value attains a maximum value at the quasi-target combined value $T_M1$. On the other hand, since the quasi-target combined value $T_M1$ is greater than the real target combined value $T_M$, the probability of selection of the combination becomes high as is the case with the combinational weighing or counting method according to the first aspect of the present invention, if a combinational calculated value close to the real target combined weight $T_M$ is selected.

According to a fifth aspect of the present invention, the combinational weighing or counting apparatus is provided with a setting means for setting a quasi-target combined value in addition to the target combined value, and also with a parameter setting means for setting a parameter for each of the driving feeders on the basis of the quasi-target combined value, thereby implementing the combinational weighing or counting method according to any one of the first and fourth aspects of the present invention.

Also, according to a sixth aspect of the present invention, the combinational weighing or counting apparatus is provided with an input setting means capable of being manipulated to input a target supply value to which the articles are to be supplied to each of the weighing hoppers, and also with a parameter setting means for setting a parameter for each of the driving feeders on the basis of the target supply value, thereby implementing the combinational weighing or counting method according to any one of the first and fourth aspects of the present invention.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Hereinafter, some embodiments of the present invention will be described with reference to the accompanying drawings. Specifically, FIGS. 1 and 2 illustrates a first preferred embodiment of the present invention.

Figure 1A:
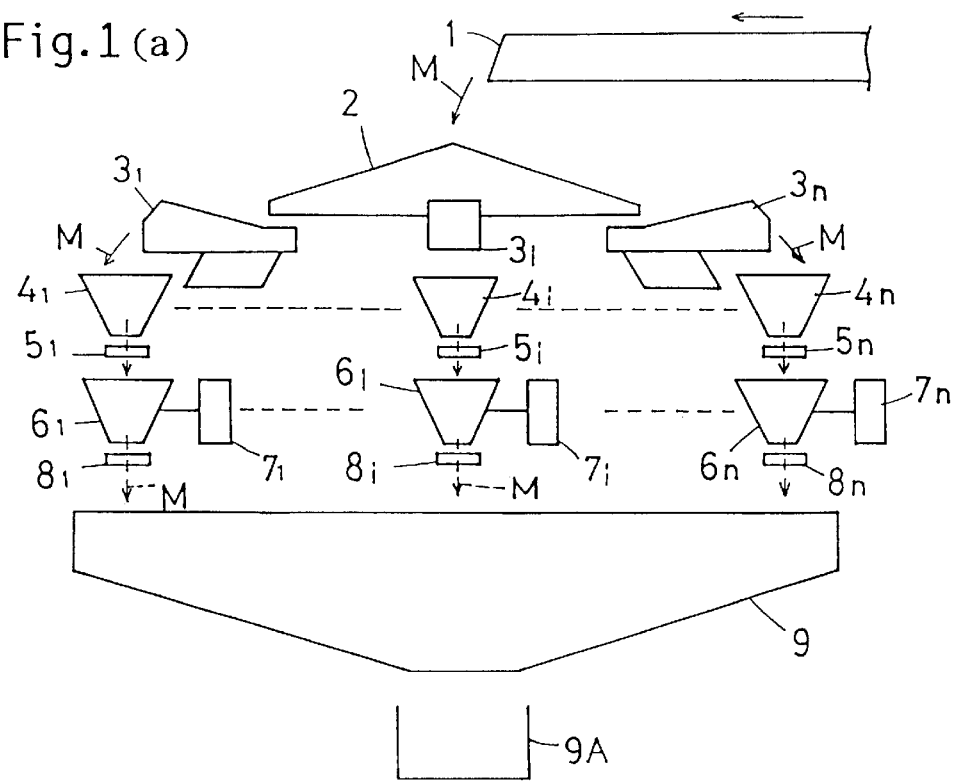
FIG. 1(a) is a schematic diagram showing a concept of a combinational weighing apparatus according to a first preferred embodiment of the present invention.
Figure 1B:
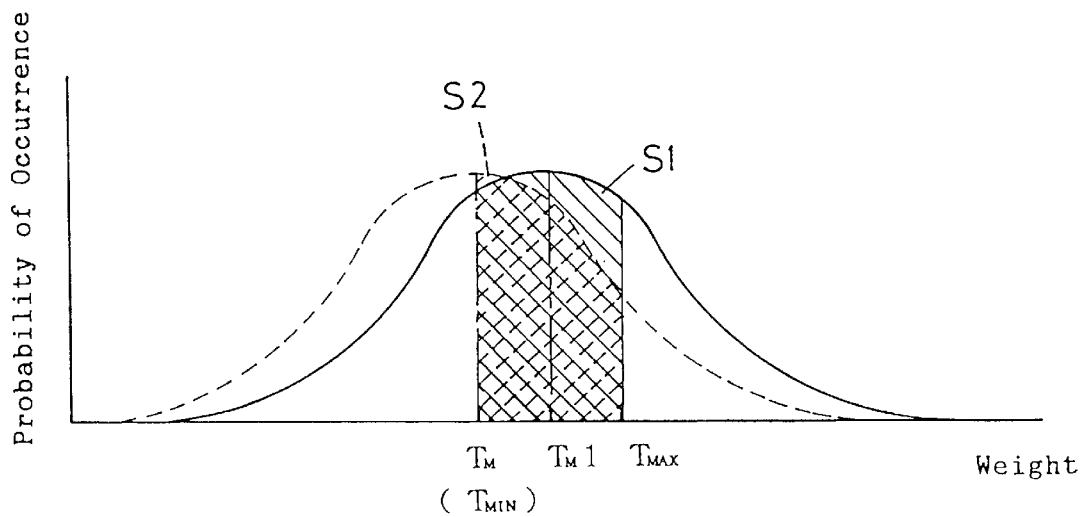
FIG. 1(b) is a diagram showing a pattern of distribution of combinational calculated weights which would result from the combinational weighing method.

Referring first to FIG. 1a and FIG. 1b, a transport conveyor 1 is operable to fall articles M to be weighed onto a central portion of a generally flat conical dispensing feeder 2. A number n of vibratory feeders or driving feeders $3_1$ to $3_n$ are disposed around and substantially beneath an outer peripheral edge of the dispensing feeder 2. Each of these driving feeders $3_1$ to $3_n$ is, while driven according to predetermined parameters, that is, while vibrated at a predetermined amplitude for a predetermined length of time, operable to feed the articles M to be weighed on the dispensing feeder 2 onto an equal number n of pooling hoppers $4_1$ to $4_n$ each provided with a respective gate $5_1$ to $5_n$. Weighing hoppers $6_1$ to $6_n$ are disposed immediately beneath the associated pooling hoppers $4_1$ to $4_n$. Each of the weighing hoppers $6_1$ to $6_n$ is provided with a respective hopper weight measuring device $7_1$ to $7_n$ and a respective gate $8_1$ to $8_n$. Positioned beneath the gates $8_1$ to $8_n$ are a relatively large-sized discharge chute 9.

Figure 2:
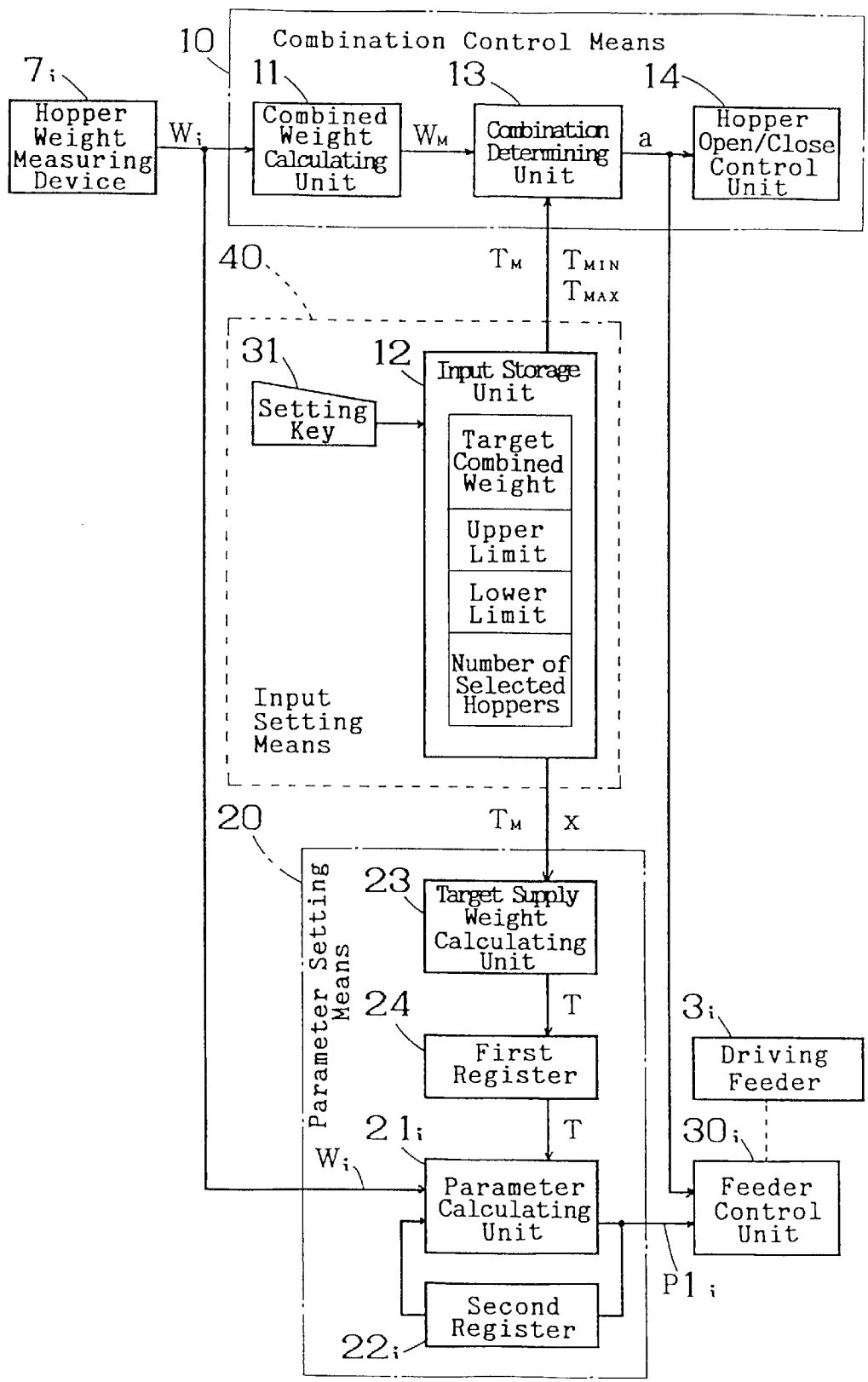
FIG. 2 is a schematic diagram showing the structure of the combinational weighing apparatus according to the first preferred embodiment of the present invention.

Referring to FIG. 2, each of the hopper weight measuring devices $7_i$ comprises, for example, a load cell and is operable to measure the weight of the article M within the corresponding weighing hopper $6_i$ (FIG. 1a and FIG. 1b) and also to output the measured weight $W_i$ to a combination control means 10 and a parameter setting means 20. It is to be noted that, in the drawings, a suffix "i" affixed to some of the reference numerals is intended to mean that the element or signal designated by the relevant reference numeral to which the suffix is affixed is employed in a plural number n. It is also to be noted that both of the combination control means 10 and the parameter setting means 20 are implemented by the use of a microcomputer (CPU).

The combination control means 10 is operable to select an appropriate combination of the weighing hoppers $6_i$ by combining some of the weights of the articles M measured respectively by the weighing hoppers $6_1$ to $6_n$ shown in FIG. 1a and FIG. 1b. The combination control means 10 shown in FIG. 2 comprises a combined weight calculating unit 11, a target weight setting unit 11, a combination determining unit 13 and a hopper open/close control unit 14. The combined weight calculating unit 11 performs a summation of a combination of arbitrarily chosen m measured weights $W_i$ out from the measured weights $W_1$ to $W_n$ measured respectively by the hopper weight measuring devices $7_1$ to $7_n$ and then outputs the summed weight $W_M$, that is, the total weight of the number m of the measured weights $W_i$ to the combination determining unit 13. This summation and the outputting of the summed weight $W_M$ are carried out subject to all combinations.

An input setting means 40 includes a setting key 31 and an input storage unit 12. The input storage unit 12 stores the target combined weight $T_M$, the upper limit $T_{MAX}$, the lower limit $T_{MIN}$ and the number x of hoppers selected, all inputted from the setting key 31. It is to be noted that it often occurs that the target combined weight $T_M$ and the lower limit $T_{MIN}$ are set to be of an equal value.

The combination determining unit 13 compares the summed weight $W_M$ with the target combined weight $T_M$ and also compares the combinational calculated weight $W_M$ falling within the range from the lower limit $T_{MIN}$ to the upper limit $T_{MAX}$ (i.e., within the allowance) with the target combined weight $T_M$ fed from the input storage unit 12, to thereby select a combination in which the weight of the articles M to be packaged is equal to the target combined weight $T_M$ or is of a value within the allowance ranging from the lower limit $T_{MIN}$ to the upper limit $T_{MAX}$. The combination determining unit 13 subsequently outputs a selection signal a to the hopper open/close control unit 14 and a feeder control unit $30_i$.

The hopper open/close control unit 14 opens the gates $8_i$ of a selected number m of the weighing hoppers $6_i$ shown in FIG. 1a and FIG. 1b. In this way, the articles M are discharged from the selected weighing hoppers $6_i$, subsequently collected together in the collecting and discharge chute 9 and finally supplied onto a packaging machine 9A. Also, the hopper open/close control units 14 (FIG. 2) opens the gates $5_i$ of some of the pool hoppers $4_i$ which are associated with the emptied weighing hoppers $6_i$, thereby allowing the articles M to be supplied from such pool hopper $4_i$ onto such weighing hoppers $6_i$. On the other hand, the feeder drive control unit $30_i$ is employed for each of the driving feeders $3_i$ and is operable to drive the driving feeders $3_i$ associated with the emptied pooling hoppers $4_i$ shown in FIG. 1a and FIG. 1b according to the predetermined parameter to deliver the articles M to the pooling hoppers $4_i$.

As shown in FIG. 2, the parameter setting means 20 comprises a target supply weight calculating unit 23 for calculating the target supply weight T, a parameter calculating unit $21_i$, and first and second registers 24 and $22_i$. The target supply weight calculating unit 23 reads both of the target combined weight $T_M$ and the number x of the hoppers to be selected from the input storage unit 12 and calculates the target supply weight T by dividing the target combined weight $T_M$ by the number x of the selected hoppers. In the illustrated embodiment, since the target supply weight T is equal for all of the weighing hoppers $6_i$, the average value of the target supply weights T is of a value equal to the target supply weight T.

The setting key 31 is capable of inputting the number x of the hoppers to be selected in terms of a real number (integer and a real number which is not an integer) including a decimal, whereas the input storage unit 12 is capable of storing the number x of the selected hoppers. The target supply weight calculating unit 23 is capable of dividing the target combined weight $T_M$ by the number x of the hoppers to be selected which is represented by the real number (the integer and the real number which is not all integer) including the decimal.

The target supply weight T is stored in the first register 24 and is subsequently read out to the parameter calculating unit $21_i$. The second register $22_i$ is used to store the parameter which has been calculated by the parameter calculating unit $21_i$ during the previous cycle and is adapted to receive a parameter signal $p1_i$ from the parameter calculating unit $21_i$.

The parameter calculating unit $21_i$ is operable to determine, based on the measured weights $W_i$ supplied from the hopper weight measuring devices $7_i$, whether the amount $W_i$ of the articles supplied into the hoppers $6_i$ (FIG. 1) is greater or smaller than the target supply weight T. If the amount $W_i$ of the articles supplied into the hoppers $6_i$ is found to be greater than the target supply weight T, the parameter calculating unit $21_i$ subtracts a single unit from the parameter supplied from the second register $22_i$ and then outputs a parameter signal $p1_i$ representing this subtracted value. On the other hand, if the amount $W_i$ of the articles supplied into the hoppers $6_i$ is found to be smaller than the target supply weight T, the parameter calculating unit $21_i$ adds a single unit to the parameter supplied from the second register $22_i$ and then outputs a parameter signal $p1_i$ representing this summed value. Again, if the amount $W_i$ of the articles supplied into the hoppers $6_i$ is found to be equal to the target supply weight T, the parameter calculating unit $21_i$ pass therethrough and outputs the parameter supplied from the second register $22_i$ as a parameter signal $p1_i$. Although not shown, both of the parameter calculating unit $21_i$ and the second register $22_i$ are employed for each of the amplitude and the vibrating time of the driving feeders $3_i$ shown in FIG. 1a and FIG. 1b.

A feeder drive control unit $30_i$ is operable in response to the parameter signal $p1_i$ from the parameter calculating unit $21_i$ to drive the driving feeders $3_i$ according to the preset parameter. Accordingly, each of the weighing hoppers $6_i$ is supplied with the articles M in a quantity approximating to the target supply weight T.

A basic operation of the combinational weighing apparatus will now be described in detail.

The articles M to be weighed are transported by the transport conveyor 1, shown in FIG. 1a and FIG. 2a, onto the dispensing feeders 2 and are, after having passed through the driving feeders $3_i$, the pooling hoppers $4_i$ and the weighing hoppers $6_i$, eventually discharged through the collecting and discharging chute 9 and into the packaging machine 9A which serves to package the articles M into, for example, a bag. At this time, the combination control means 10 selects all appropriate combination of the number m of the weighing hoppers $6_i$ (FIG. 1a and 1b) as hereinbefore described. On the other hand, the hopper open/close control unit 14 opens the gates $5_i$ of some of the pooling hoppers 4 operatively associated with the weighing hoppers $6_i$ from which the articles M have been discharged, so that the articles M can be supplied from the pooling hoppers $4_i$ onto the empty weighing hoppers $6_i$. Also, the driving feeders $3_i$ operatively associated with the emptied pooling hoppers $4_i$ are driven to supply the articles M to the empty pooling hoppers $4_i$.

The number x of the hoppers to be selected referred to above is set to be, for example, 4.8 where the target combined weight $T_M$ is set to be 100 gram, the upper limit $T_{MAX}$ is set to be 110 gram and the number of the weighing hoppers $6_i$ is 10 (a 10-head machine). The reason therefor will now be discussed.

As hereinbefore discussed in connection with the prior art, where the number of the weighing hoppers $6_i$ is ten, the number of the combinational calculated weights $W_M$ in which arbitrarily chosen number m of the weighing hoppers are selected will attain a maximum value when the arbitrarily chosen number m is 5. Therefore, the number of the weighing hoppers to be selected may be considered to be 5.

Since if the number x of the weighing hoppers to be selected is assumed to be 5, the target supply weight T shown in FIG. 2 becomes equal to the target combined weight $T_M$ divided by 5, i.e., $T=T_M/5$, there is the highest probability that the combinational calculated weight $W_M$ in which the respective weights measured by the five weighing hoppers $6_i$ are combined is of a value equal to the target combined weight $T_M$ and the pattern of distribution of probabilities of occurrence of the combinational calculated weights $W_M$ is such as shown by the phantom line in FIG. 1(b). For this reason, the probability of occurrence of a value slightly smaller than the target combined weight $T_M$, that is, the lower limit $T_{MIN}$ becomes high as well and, since the combinational calculated weight $W_M$ which is smaller than lower limit $T_{MIN}$ cannot be selected, there is a possibility that no combinational selection takes place. In other word, if the number x of the selected hoppers is 5, the number of the weighing hoppers $6_i$ actually selected will become greater than 5.

On the other hand, if the number x of the weighing hoppers to be selected is chosen to be 4.8, the target combined weight $T_M$ divided by 4.8, i.e., 100/4.8, results in the target supply weight T of 20.8 gram. Accordingly, the value $T_M1$ at which the probability of occurrence of the combinational calculated weight $W_M$ in which the five measured weights $W_i$ are combined attains a maximum (highest) value is given by a multiplication of the target supply weight T by 5, that is, 20.8×5=104gram, which is greater than the target combined weight $T_M$ and falls within the allowance of the lower limit $T_{MIN}$ (100 gram) to the upper limit $T_{MAX}$ (110 gram). In this case, a pattern of distribution of the probability of occurrence of the combinational calculated weight $W_M$ is such as shown by the solid line in FIG. 1(b) and the probability of occurrence of the combination selected weight $W_S$ shown by the area S1 hatched by the solid line in FIG. 1(b) is greater than the probability of occurrence thereof shown by the area S2 hatched by the phantom line in FIG. 1(b) according to the prior art and, consequently, the cases in which no combinational selection takes place are minimized. Thus, by selecting the number x of the selected weighing hoppers to be 4.8, that is, by choosing the value equal to the target combined weight $T_M$ divided by a real number, which is not an integer, for the target supply weight T (for example, 20.8 gram) to which the articles are to be supplied into the weighing hoppers $6_i$, there is a high tendency that the number of the weighing hoppers $6_i$ actually selected is 5.

In the meantime, in the prior art combinational weighing apparatus disclosed in the Japanese Patent Publication No. 62-30367, the target supply weight for each of the weighing hoppers is chosen to be (T−ΔT), T and (T+ΔT). In this prior art combinational weighing apparatus, although the weighing hopper for which the target supply weight is chosen to be T is of a value equal to the target combined weight $T_M$ divided by an integer, considering only the weighing hoppers for which the target supply weight is chosen to be (T−ΔT) or (T+ΔT), the value equal to the target combined weight $T_M$ divided by a real number including a decimal is set for the target supply weight. However, according to this prior art, the average value of the target supply weights is T and, accordingly, it does not bring about such function and effects as accomplished by the present invention. Accordingly, whether or not it is included within the scope of the present invention is to be determined in consideration of whether or not the average value T of the target supply weights $T_i$ for all of the weighing hoppers is equal to the target combined weight $T_M$ divided by a real number which is not an integer, not in consideration of whether or not the individual target supply weight $T_i$ is equal to the target combined weight $T_M$ divided by a real number which is not an integer.

According, however, to the first preferred embodiment of the present invention discussed hereinbefore, the value equal to the target combined weight $T_M$ divided by a real number which is not all integer is chosen to be the target supply weight T to which the articles are to be supplied into the weighing hoppers $6_i$, so that the value $T_M1$ at which the probability of occurrence of the combinational calculated weight $W_M$ attains a maximum value is greater than the target combined weight $T_M$ and falls within the allowance ranging from the lower limit $T_{MIN}$ to the upper limit $T_{MAX}$. However, as will be described subsequently, by setting a quasi-target combined weight $T_M1$ which is greater than the target combined weight $T_M$ and falls within the allowance from the lower limit $T_{MIN}$ to the upper limit $T_{MAX}$ and then by setting the parameter for each driving feeders $3_i$ based on the quasi-target combined weight $T_{M1}$, the combinational calculated weight $W_M$ at which the probability of occurrence attains a maximum value may be chosen to be greater than the target combined weight $T_M$ while falling within the allowance from the lower limit $T_{MIN}$ to the upper limit $T_{MAX}$.

Figure 3:
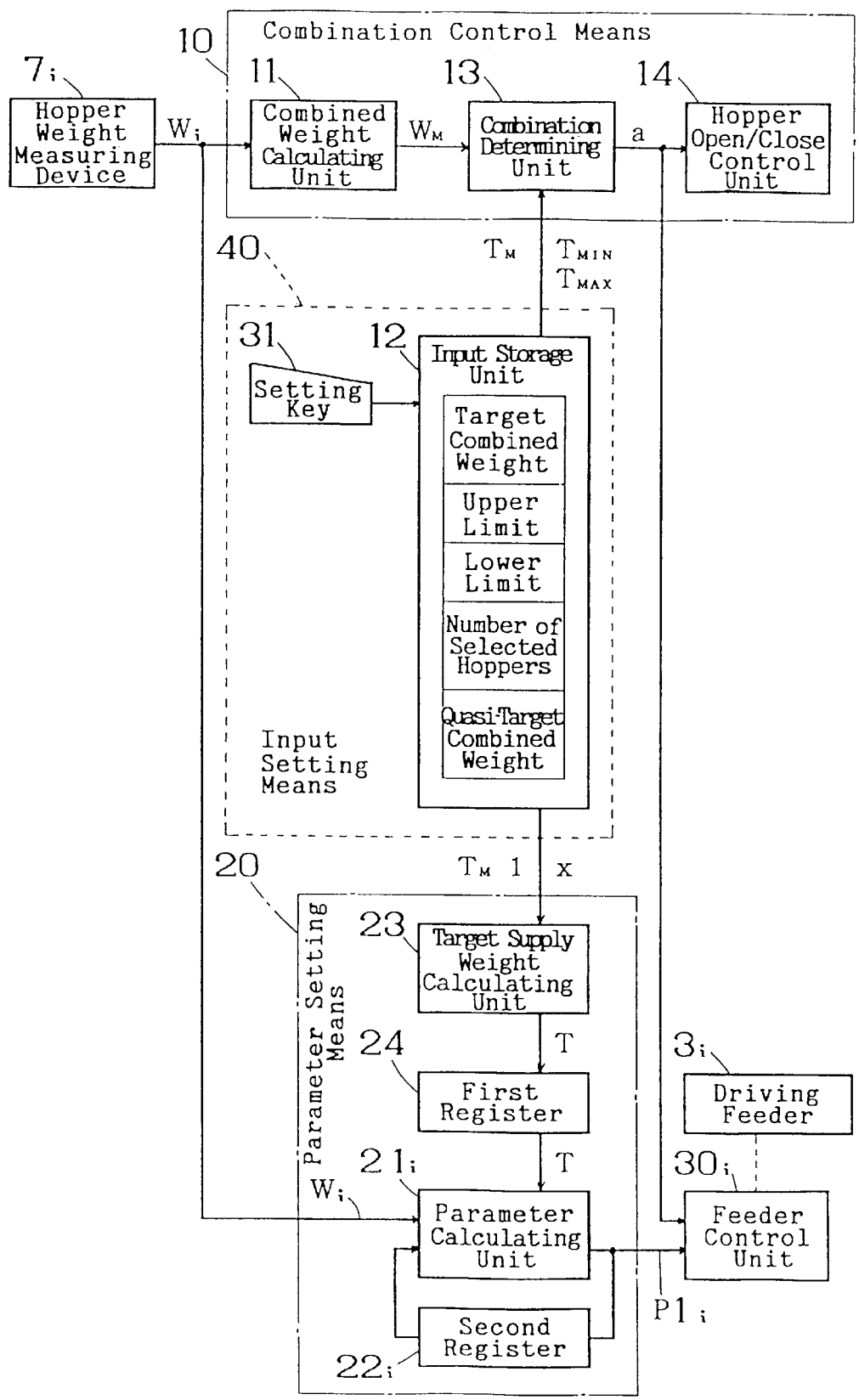
FIG. 3 is a schematic diagram showing the structure of the combinational weighing apparatus according to a second preferred embodiment of the present invention.

FIG. 3 illustrates a second preferred embodiment of the present invention. Referring to FIG. 3, the input storage unit 12 stores, in addition to the target combined weight $T_M$, the quasi-target combined weight $T_M1$ which has been inputted thereto from the setting key 31. Both of the quasi-target combined weight $T_M1$ and the number x of the hoppers to be selected are outputted to the target supply weight calculating unit 23. The target supply weight calculating unit 23 determines the target supply weight T by dividing the quasi-target combined weight $T_M1$ by the number x of the hoppers to be selected, which target supply weight T is subsequently stored in the first register 24. Accordingly, the parameter calculating unit $21_i$ of the parameter setting means 20 determines the parameter for each driving feeder $3_i$ on the basis of the quasi-target combined weight $T_M1$.

As shown in FIG. 1(b), the quasi-target combined weight $T_M1$ is set to a value greater than the target combined weight $T_M$ and falling within the allowance from the lower limit $T_{MIN}$ to the upper limit $T_{MAX}$. By way of example, if the target combined weight $T_M$ is 100 gram and the upper limit $T_{MAX}$ is 110 gram, the quasi-target combined weight $T_M1$ is set to be 104 gram. Where the number of the weighing hoppers $6_i$ is 10, the number x of the hoppers to be selected is set to be 5. Accordingly, even in this second preferred embodiment of the present invention, the target supply weight T is chosen to be 20.8 gram as is the case with the first preferred embodiment of the present invention and the pattern of distribution of the probability of occurrence of the combinational calculated weight $W_M$ represents such as shown in FIG. 1(b).

On the other hand, since in selecting the weighing hoppers $6_i$ the combination determining unit 13 selects a combination of the weighing hoppers $6_i$ on the basis of the target combined weight $T_M$, not the quasi-target combined weight $T_M1$ shown in FIG. 3, the combination selected weight $W_S$ will take a value close to the target combined weight $T_M$. It is to be noted that, in the practice of the second preferred embodiment of the present invention, the number x of the hoppers to be selected may be inputted in the form of an integer as is the case with the prior art. Since other structural features than those described above are similar to those described in connection with the first preferred embodiment of the present invention, parts shown in FIG. 3 which are similar to parts shown in FIG. 2 are designated by like reference numerals employed in FIG. 2 and the details thereof are not reiterated for the sake of brevity.

It is to be noted that in the practice of any one of the first and second preferred embodiments of the present invention, the target supply weight calculating unit 23 performs the following calculations to determine the target supply weight T.

$$T=T_M/x \quad (x \text{ is a real number which is not an integer.}) \tag{1}$$

$$T=T_M1/x \quad (x \text{ is a natural number and } T_M<T_M1<T_{MAX}) \tag{2}$$

However, in the practice of the present invention, the target supply weight calculating unit 23 may be designed to perform the following calculations (3) to (6) to give rise to the effects of the present invention and, therefore, this alternative should be included within the scope of the present invention.

$$T=(T_{MIN}+T_{MAX})/(2 \cdot x) \quad (x \text{ is a natural number.}) \tag{3}$$

$$T=(T_M/x)/\alpha (x \text{ is a natural number and } \alpha \text{ is a number smaller than 1, for example, 0.95}) \tag{4}$$

$$T=(T_M/x)\beta (x \text{ is a natural number and } \beta \text{ is a number greater than 1, for example, 1.05}) \tag{5}$$

$$T=(T_M/x)+\Delta\gamma(x \text{ is a natural number and } \Delta\gamma \text{ is a value such as about 1 gram.}) \tag{6}$$

Where the target supply weight T is to be determined according to the foregoing equations (3) to (6), the target supply weight calculating unit 23 shown in FIG. 2 should be modified.

Figure 4:
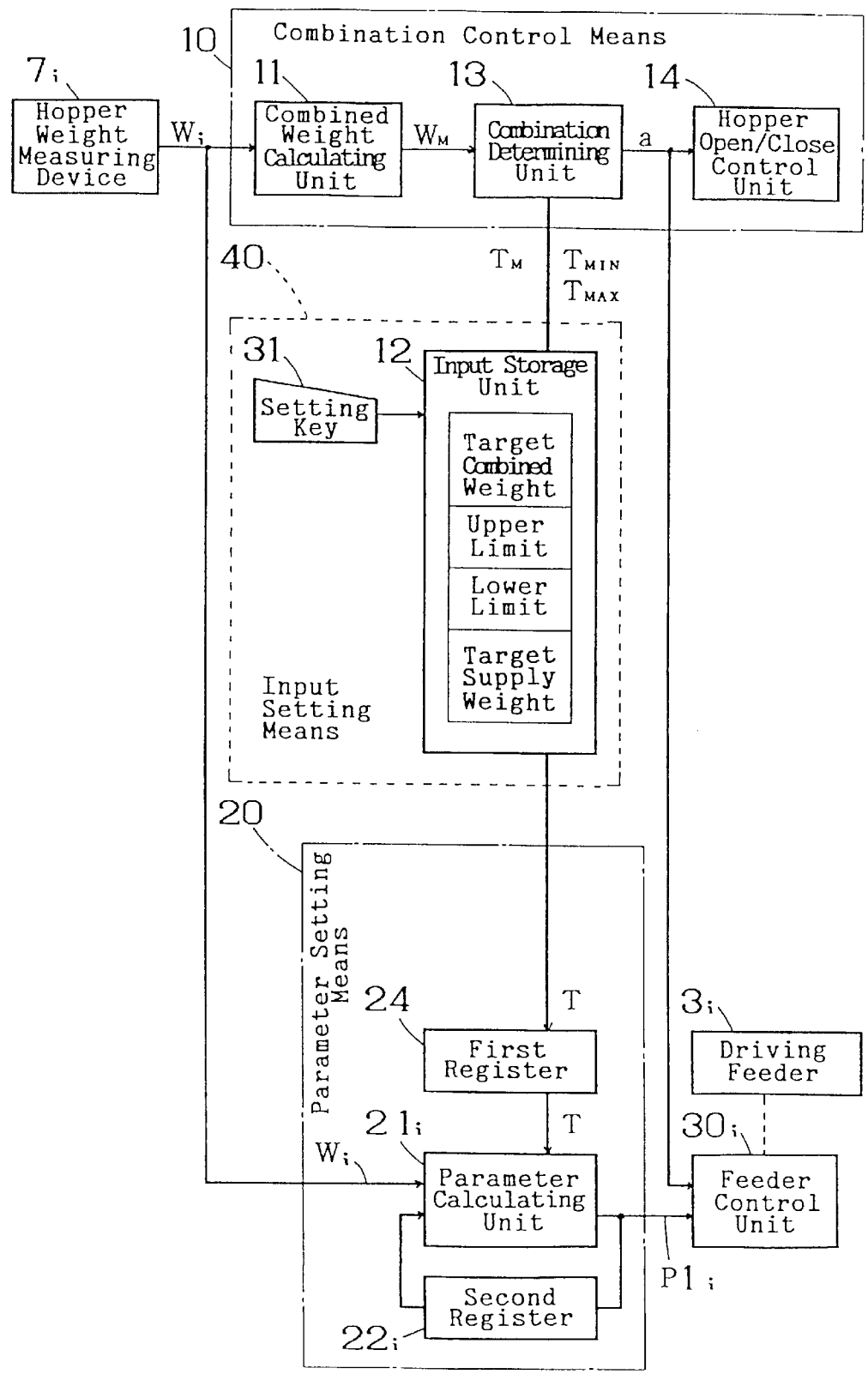
FIG. 4 is a schematic diagram showing the structure of the combinational weighing apparatus according to a third preferred embodiment of the present invention.

A third preferred embodiment of the present invention is shown in FIG. 4, reference to which will now be made.

Referring now to FIG. 4 all input setting means 40 is capable of inputting the target supply weight T to which the articles are to be supplied into the weighing hoppers $6_i$. In other words, the target supply weight T is inputted from the setting (key 31 and is subsequently stored in the input storage unit 12. This target supply weight T is then transferred to the first register 24 which outputs it to the parameter calculating unit $21_i$. Accordingly, the parameter calculating unit $21_i$ of the parameter setting means 20 is capable of setting the parameter for each driving feeder $3_i$ on the basis of the target supply weight T. By way of example, if the target combined weight $T_M$ is 100 gram, the upper limit $T_{MAX}$ is 110 gram and the number of the weighing hoppers $6_i$ is 10, the target supply weight T is set to be 20.8 gram. Accordingly, even with the third preferred embodiment of the present invention, similar effects to those given by any one of the first and second preferred embodiment of the present invention can be obtained. Since other structural features than those described above are similar to those described in connection with the first preferred embodiment of the present invention, parts shown in FIG. 4 which are similar to parts shown in FIG. 2 are designated by like reference numerals employed in FIG. 2 and the details thereof are not reiterated for the sake of brevity.

In describing any one of the first to third preferred embodiments of the present invention, the combinational weighing apparatus (the 10-head machine) has been descried as having ten weighing hoppers $6_i$. However, the present invention is not always limited thereto and is equally applicable to any other head number machine such as a 14-head combinational weighing apparatus in which the number of the weighing hoppers $6_i$ employed is 14.

In the 14-head combinational weighing apparatus, the combination control means 10 shown in FIG. 1a and FIG. 1b selects in weighing hoppers $6_i$ out from the 14 weighing hoppers $6_i$ and again selects k weighing hoppers $6_i$ out from the remaining weighing hoppers $6_i$, that is, (14−m) weighing hoppers $6_i$. Accordingly, after the selection, the weighing hoppers $6_i$ are selected from the number of the weighing hoppers $6_i$ which is smaller than 14. By way of example, assuming that the five weighing hoppers $6_i$ are selected out from the remaining ten weighing hoppers $6_i$ which are smaller in number than the total number of the weighing hoppers $6_i$ employed, the number of the still remaining weighing hoppers $6_i$ is 5 and, therefore, even though the number of the weighing hoppers $6_i$ to which the articles are newly supplied from the associated driving feeders $3_i$, which is 4 is added, selection must be made from the nine weighing hoppers $6_i$ and the accuracy of selection of the combination will therefore be lowered. Accordingly, in the case of the 14-head combinational weighing apparatus or the like apparatus wherein selection cannot be made from all of the weighing hoppers $6_i$, it is important to render the number of the weighing hoppers actually selected to be a predetermined value.

However, in the weighing apparatus of the present invention, it is possible to render the number of the weighing hoppers $6_i$ actually selected to be close to a predetermined value such as, for example, 4. In other words, since the number of the weighing hoppers selected can be controlled, the accuracy of selection of the combination increases.

Figure 5:
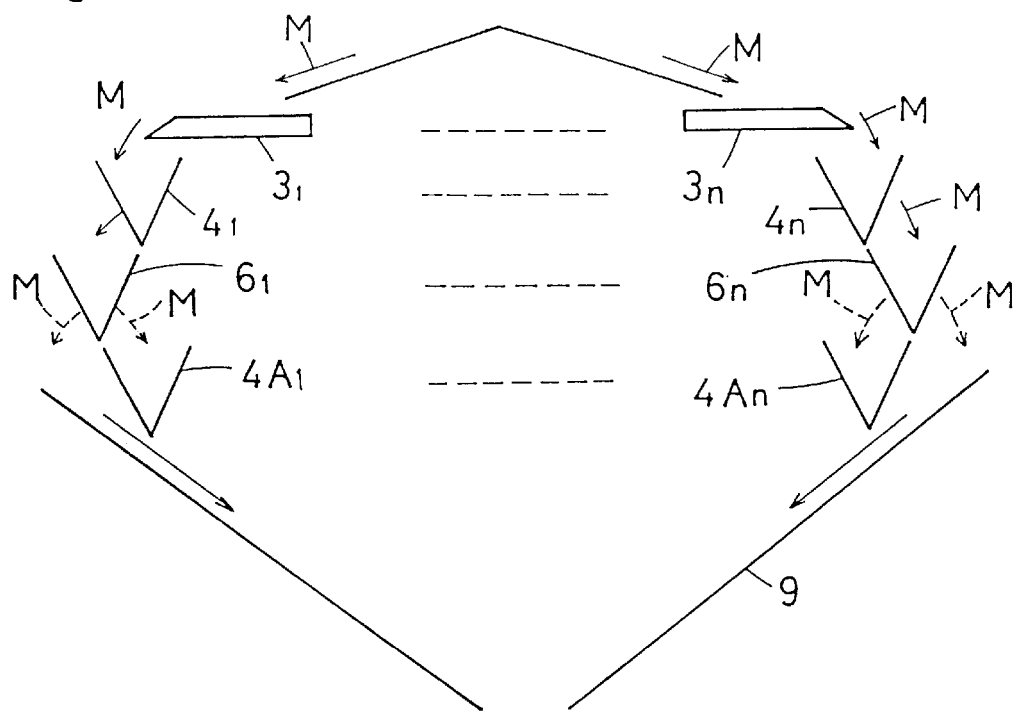
FIG. 5 is a schematic diagram showing a concept of a basic structure of the combinational weighing apparatus equipped with a booster.
Figure 6:
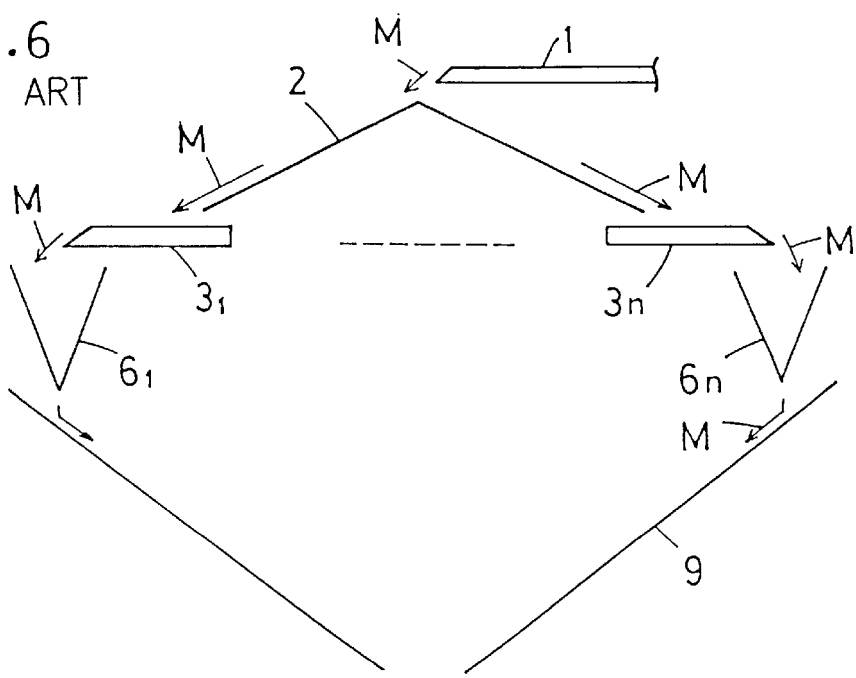
FIG. 6 is a schematic diagram showing one example of a general combinational weighing apparatus.

In addition, the present invention can be equally applicable to the combinational weighing apparatus of a type equipped with an auxiliary hopper system as shown in FIG. 5. In the system of FIG. 5, each of the weighing hoppers $6_1$ to $6_n$ is equipped with two gates which are selectively opened to supply the articles M into an associated auxiliary hopper $4A_i$ or into the collecting and discharging chute 9. Accordingly, the number of the hoppers which can be used for selection of the combination is twice the number of the weighing hoppers $6_1$ to $6_n$.

Also, in describing any one of the foregoing first to third preferred embodiments of the present invention, reference has been made to the combinational weighing apparatus operable to weigh the articles M to the target combined weight $T_M$. However, the present invention is also applicable to a combinational counting apparatus operable to count the articles, such as screws or like machine parts, to a target combined count. In such combinational counting apparatus, the number of the articles M held in the weighing hoppers $6_i$ is detected by measuring the weight of the articles M therein, and an appropriate combination of the weighing hoppers $6_i$ is chosen so as to obtain a combined number of the articles M equal to the target combined count or within the allowance.

As hereinbefore fully described, according to the present invention, since the probability of occurrence of the combined calculated weight is maximized at the value greater than the target combined value within the allowance, the probability of selection of the combination is high as compared with that according to the prior art.

The present invention has been described in connection with the preferred embodiments thereof with reference to the accompanying drawings. It is, however, to be noted that various changes and modifications are apparent to those skilled in the art within the framework of disclosure made herein and, therefore, such changes and modifications are to be understood as included within the scope of the present invention as defined by the appended claims, unless they depart therefrom.

What is claimed is:

1. A combinational weighing or counting method which comprises the steps of:

supplying from an upstream side articles to a plurality of weighing hoppers by driving a corresponding number of driving feeders;

selecting as a combination selected value, one of combinational calculated values which are obtained by combining measured values of the articles supplied into the weighing hoppers, which is one of a value within a weight allowance between a lower limit equal to a target combined value and an upper limit near in value to the target combined value to present a product; and controlling a supply ability of each of the driving feeders on the basis of a target supply value to which the articles are to be supplied to each of the weighing hoppers so that the value, at which a probability of occurrence of the combinational calculated value is maximum, is greater than the target combined value but falls within the allowance.

2. A combinational weighing or counting method which comprises the steps of:

supplying from an upstream side articles to a plurality of weighing hoppers by driving a corresponding number of driving feeders;

selecting as a combination selected value, one of combinational calculated values which are obtained by combining measured values of the articles supplied into the weighing hoppers, which one is of a value within an allowance including a target combined value and near in value to the target combined value; and setting a quotient of target combined value divided by a real number which is close to the number of the weighing hoppers which provides a greatest number of combinations which is not an integer and which is closer to the number of the weighing hoppers which provides a greatest number of combinations than an integer next to or immediately preceding said number of the weighing hoppers, to be an average value of target supply values to which the articles are to be supplied to the respective weighing hoppers so that the value, at which a probability of occurrence of the combinational value is maximum, is greater than the target combined value but falls with the allowance.

3. The combinational weighing or counting method as claimed in claim 2, wherein the real number which is not an integer is a value slightly smaller than the number of the weighing hoppers which provides a greatest number of combinations.

4. A combinational weighing or counting apparatus which comprises:

a plurality of weighing hoppers;

a plurality of driving feeders for supplying articles from an upstream side towards the corresponding weighing hoppers when the driving feeders are driven;

means for selecting, as a combination selected value, one of combinational calculated values which are obtained by combining measured values of the articles supplied into the weighing hoppers, which one is of a value within an allowance including a target combined value and near in value to the target combined value;

an input setting means capable of being manipulated to input an integer or a real number which is not an integer, as a number of the weighing hoppers to be selected for determining a target supply value, to which the articles are to be supplied to the individual weighing hopper, which is obtained by dividing the target combined value so that the value, at which a probability of occurrence of the combinational calculated value is maximum, is greater than the target combined value but falls within the allowance; and a target supply value calculating unit for obtaining said target supply value by dividing the target combined value by the number of the selected weighing hoppers which is the integer or the real number which is not an integer.

5. The combinational weighing or counting apparatus as claimed in claim 4, wherein the real number which is not an integer is a value slightly smaller than the number of the weighing hoppers which provides a greatest number of combinations.

6. A combinational weighing or counting method which comprises the steps of:

supplying from an upstream side articles to a plurality of weighing hoppers by driving a corresponding number of driving feeders;

selecting as a combination selected value, one of combinational calculated values which are obtained by combining measured values of the articles supplied into the weighing hoppers, which one is of a value within an allowance including a target combined value and near in value to the target combined value; and setting a parameter for controlling a supply ability of each of the driving feeders on the basis of a quasi-target combined value which is greater than the target combined value, but falling within the allowance so that the value, at which a probability of occurrence of the combinational value is maximum, is greater than the target combined value but falls with the allowance.

7. A combinational weighing or counting apparatus which comprises:

a plurality of weighing hoppers;

a plurality of driving feeders for supplying articles from an upstream side towards the corresponding weighing hoppers when the driving feeders are driven;

means for selecting, as a combination selected value, one of combinational calculated values which are obtained by combining measured values of the articles supplied into the weighing hoppers, which one is of a value within an allowance including a target combined value and near in value to the target combined value;

a setting means for setting a quasi-target combined value in addition to the target combined value so that the value, at which a probability of occurrence of the combinational value is maximum, is greater than the target combined value but falls with the allowance; and a parameter setting means for setting a parameter for controlling a supply ability of each of the driving feeders on the basis of the quasi-target combined value.

8. A combinational weighing or counting apparatus which comprises:

a plurality of weighing hoppers;

a plurality of driving feeders for supplying articles from an upstream side towards the corresponding weighing hoppers when the driving feeders are driven;

means for selecting, as a combination selected value, one of combinational calculated values which are obtained by combining measured values of the articles supplied into the weighing hoppers, which one is of a value within an allowance including a target combined value and near in value to the target combined value;

an input setting means capable of being manipulated to input a target supply value to which the articles are to be supplied to each of the weighing hoppers so that the value, at which a probability of occurrence of the combinational calculated value is maximum, is greater than the target combined value but falls within the allowance; and a parameter setting means for setting a parameter for controlling a supply ability of each of the driving feeders on the basis of the target supply value.

* * * * *